United States Patent
Sonoda et al.

(10) Patent No.: US 12,391,306 B2
(45) Date of Patent: Aug. 19, 2025

(54) STEER-BY-WIRE TYPE STEERING DEVICE

(71) Applicant: HITACHI ASTEMO, LTD., Hitachinaka (JP)

(72) Inventors: Hiroki Sonoda, Hitachinaka (JP); Yoshiji Hasegawa, Hitachinaka (JP); Tomoaki Fujibayashi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 251 days.

(21) Appl. No.: 18/044,355

(22) PCT Filed: Sep. 2, 2021

(86) PCT No.: PCT/JP2021/032278
§ 371 (c)(1),
(2) Date: Mar. 7, 2023

(87) PCT Pub. No.: WO2022/054683
PCT Pub. Date: Mar. 17, 2022

(65) Prior Publication Data
US 2023/0339534 A1     Oct. 26, 2023

(30) Foreign Application Priority Data

Sep. 9, 2020   (JP) ................. 2020-151396

(51) Int. Cl.
*B62D 5/04*     (2006.01)
*B62D 6/00*     (2006.01)
*B62D 15/00*    (2006.01)

(52) U.S. Cl.
CPC ........... *B62D 5/046* (2013.01); *B62D 5/0475* (2013.01); *B62D 6/008* (2013.01); *B62D 15/00* (2013.01)

(58) Field of Classification Search
CPC ...... B62D 5/046; B62D 5/0475; B62D 15/00; B62D 5/001; B62D 6/008
See application file for complete search history.

(56) References Cited

FOREIGN PATENT DOCUMENTS

| JP | 2002-029441 A | | 1/2002 |
|----|---------------|---|--------|
| JP | 2013023145 A | * | 2/2013 |

OTHER PUBLICATIONS

International Search Report dated Nov. 22, 2021 issued in International Application No. PCT/JP2021/032278, with English translation, 5 pages.

(Continued)

*Primary Examiner* — Jacob M Amick
(74) *Attorney, Agent, or Firm* — FOLEY & LARDNER LLP

(57) ABSTRACT

A steering device according to the present invention includes: a steering input device including a reaction force actuator that applies a steering reaction force to a steering operation input member; and a control device including a steering gear ratio change unit that changes a steering gear ratio in accordance with a vehicle speed, a reaction force actuator control unit that controls an output amount of the reaction force actuator in accordance with an operation angular velocity of the steering operation input member, and a reaction force actuator output amount change unit that changes, based on the steering gear ratio, the output amount of the reaction force actuator. This makes it possible to set an appropriate steering reaction force applied to the steering operation input member, thereby stably reducing the operational burden on a driver.

7 Claims, 12 Drawing Sheets

(56) References Cited

OTHER PUBLICATIONS

International Preliminary Report on Patentability and Written Opinion dated Mar. 23, 2023 issued in International Patent Application No. PCT/JP2021/032278, with English Translation, 12 pages.

* cited by examiner

STEER-BY-WIRE TYPE STEERING DEVICE

TECHNICAL FIELD

The present invention relates to a steer-by-wire type steering device.

BACKGROUND ART

A vehicle steering device of Patent Document 1 calculates a steering gear ratio G and a turning angle δ based on a vehicle speed V and further calculates a steering reaction force T from the sum of a steering reaction force component T (V, θ) corresponding to the vehicle speed V and a steering angle θ, a friction component Tf, and a steering reaction force component T (θ') corresponding to a steering angular velocity θ', and the steering reaction force component T (V, θ) is characterized in having a smaller value as the vehicle speed V increases.

REFERENCE DOCUMENT LIST

Patent Document

Patent Document 1: JP 2013-23145 A

SUMMARY OF THE INVENTION

Problem to be Solved by the Invention

In a steer-by-wire type steering device, when a steering gear ratio is set to be variable and a steering reaction force applied to a steering operation input member such as a steering wheel is set to be variable in accordance with an operation angular velocity [deg/s] of the steering operation input member, a set value of the steering reaction force may become too small or too large depending on the steering gear ratio, which may increase the operational burden on a driver.

The present invention has been made in view of conventional circumstances, and an object thereof is to provide a steer-by-wire type steering device capable of setting an appropriate steering reaction force applied to a steering operation input member, thereby stably reducing the operational burden on a driver.

Means for Solving the Problem

According to the present invention, in one aspect, a steer-by-wire type steering device mounted in a vehicle includes: a steering input device including a steering operation input member, and a reaction force actuator that applies a steering reaction force to the steering operation input member; and a control device including a steering gear ratio change unit that changes a steering gear ratio in accordance with a vehicle speed of the vehicle, the steering gear ratio being a ratio of a steering angle of a wheel of the vehicle to an operation angle of the steering operation input member, a reaction force actuator control unit that controls an output amount of the reaction force actuator in accordance with an operation angular velocity of the steering operation input member, and a reaction force actuator output amount change unit that changes, based on the steering gear ratio, the output amount of the reaction force actuator corresponding to the operation angular velocity.

Effects of the Invention

According to the present invention, it is possible to set an appropriate steering reaction force applied to the steering operation input member, thereby stably reducing the operational burden on a driver, even under different conditions of the steering gear ratio and the operation angular velocity of the steering operation input member.

MODE FOR CARRYING OUT THE INVENTION

Hereinbelow, embodiments of a steer-by-wire type steering device according to the present invention will be described with reference to the drawings.

Figure 1:
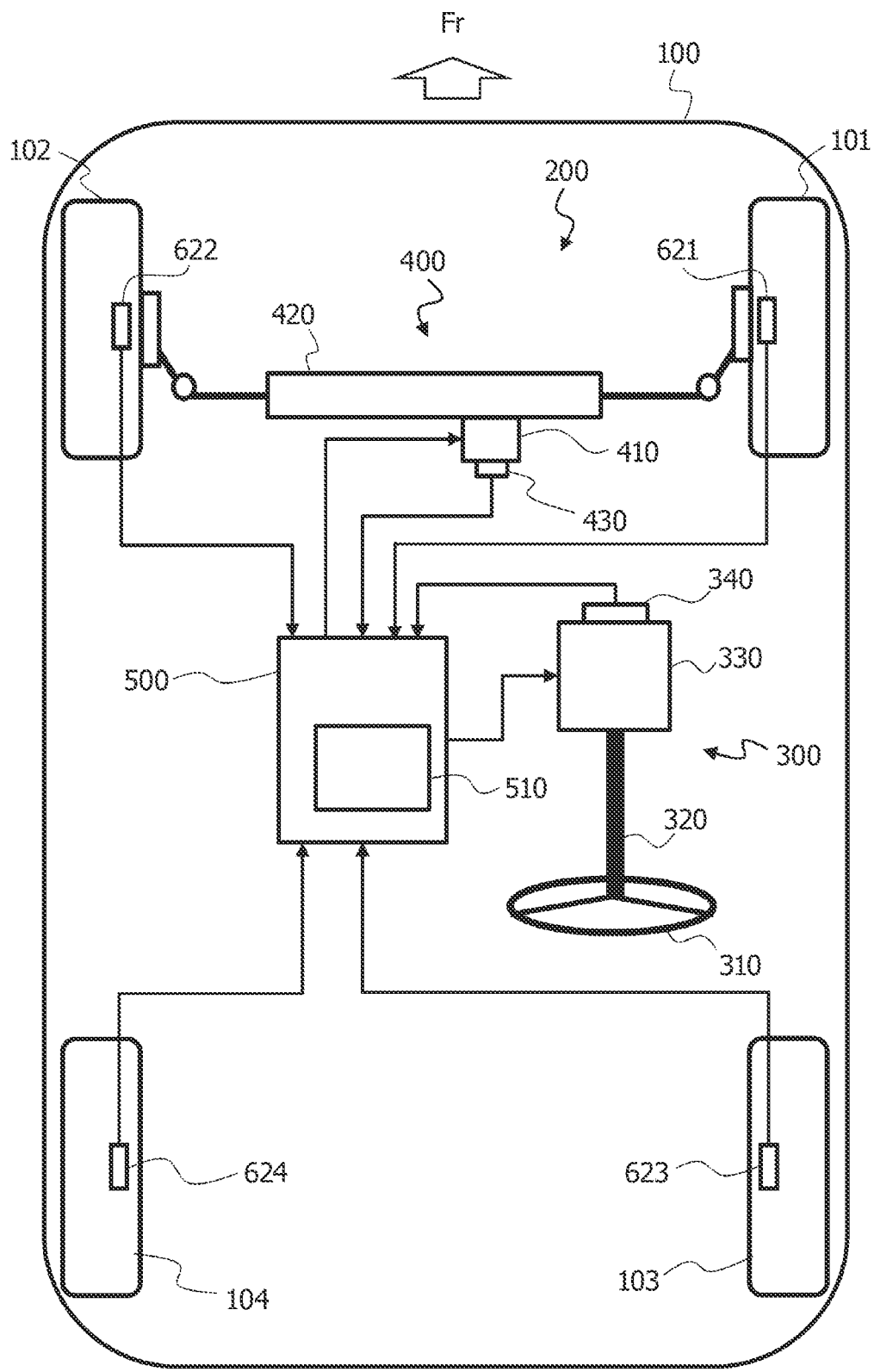
FIG. 1 is a system configuration diagram of a steer-by-wire type steering device.

FIG. 1 is a system configuration diagram illustrating one aspect of a steer-by-wire type steering device 200 mounted on a vehicle 100 such as a motor vehicle. Reference character Fr in FIG. 1 indicates the front of the vehicle.

Steering device 200 is a steering system in which front wheels 101 and 102 to be turned are mechanically separated from a steering wheel 310 serving as a steering operation input member.

Steering device 200 includes a steering input device 300 including steering wheel 310, a steering actuator device 400, and a steering control device 500.

Steering input device 300 includes steering wheel 310, a steering shaft 320, a reaction force actuator 330, and an operation angle sensor 340.

Steering shaft 320 rotates in response to turning of steering wheel 310, but is mechanically separated from front wheels 101 and 102.

Reaction force actuator 330 is a device that applies a steering reaction force to steering shaft 320 using a motor and the like and includes, for example, a torque damper, an operation angle limiting mechanism, and a speed reducer in addition to the motor.

Since steering device 200 includes reaction force actuator 330 described above, a difference between an operation torque generated by a driver of vehicle 100 operating steering wheel 310 and a steering reaction force torque generated by reaction force actuator 330 turns steering wheel 310.

Operation angle sensor 340 is a sensor that detects a rotation angle of steering shaft 320, in other words, an operation angle θ of steering wheel 310.

Operation angle sensor 340, for example, detects that the operation angle θ is zero when steering wheel 310 is located at a neutral position, and indicates the operation angle θ in the right direction with a plus and the operation angle θ in the left direction with a minus.

Note that, in the present application, an increase in the operation angle θ includes both an increase in the operation angle θ in the right direction and an increase in the operation angle θ in the left direction.

Steering actuator device 400 includes a steering actuator 410 such as a motor, a turning mechanism 420 that turns front wheels 101 and 102 using the steering actuator, and a steering angle sensor 430 that detects a steering angle δ of front wheels 101 and 102 (in other words, a turning angle of the front wheels) from a position of steering actuator 410.

Steering control device 500 is an electronic control device mainly composed of a microcomputer 510 including a microprocessor unit (MPU), a read only memory (ROM), and a random access memory (RAM). Steering control device 500 performs an arithmetic process based on various signals acquired from the outside and outputs a control signal for reaction force actuator 330 and a control signal for steering actuator 410.

Also, vehicle 100 includes wheel speed sensors 621 to 624 that detect wheel speeds, which are rotation speeds of wheels 101 to 104, respectively.

Steering control device 500 acquires detection signals output from operation angle sensor 340, steering angle sensor 430, and wheel speed sensors 621 to 624.

Then, steering control device 500 calculates a target steering angle δtg based on a detection value of the operation angle θ of steering wheel 310 and a set value of a steering gear ratio Kg and calculates a control signal to be output to steering actuator 410 so that the steering angle δ of front wheels 101 and 102 approaches the target steering angle δtg.

Note that the steering gear ratio Kg is a value defined as "Steering gear ratio Kg=Operation angle θ of steering wheel 310/Steering angle δ of front wheels 101 and 102" and can be set to any value in steer-by-wire type steering device 200.

As the steering gear ratio Kg decreases, the steering angle δ of front wheels 101 and 102 relative to the operation angle θ of steering wheel 310 increases, and a slight turn of steering wheel 310 greatly changes the turning angle of front wheels 101 and 102.

On the other hand, as the steering gear ratio Kg increases, the steering angle δ of front wheels 101 and 102 relative to the operation angle θ of steering wheel 310 decreases, and steering wheel 310 needs to be turned much more to change the turning angle of front wheels 101 and 102.

Hereinbelow, a process of setting the steering gear ratio Kg and a steering reaction force torque Ts (in other words, an output amount of reaction force actuator 330) by steering control device 500 will be described in detail.

Figure 2:
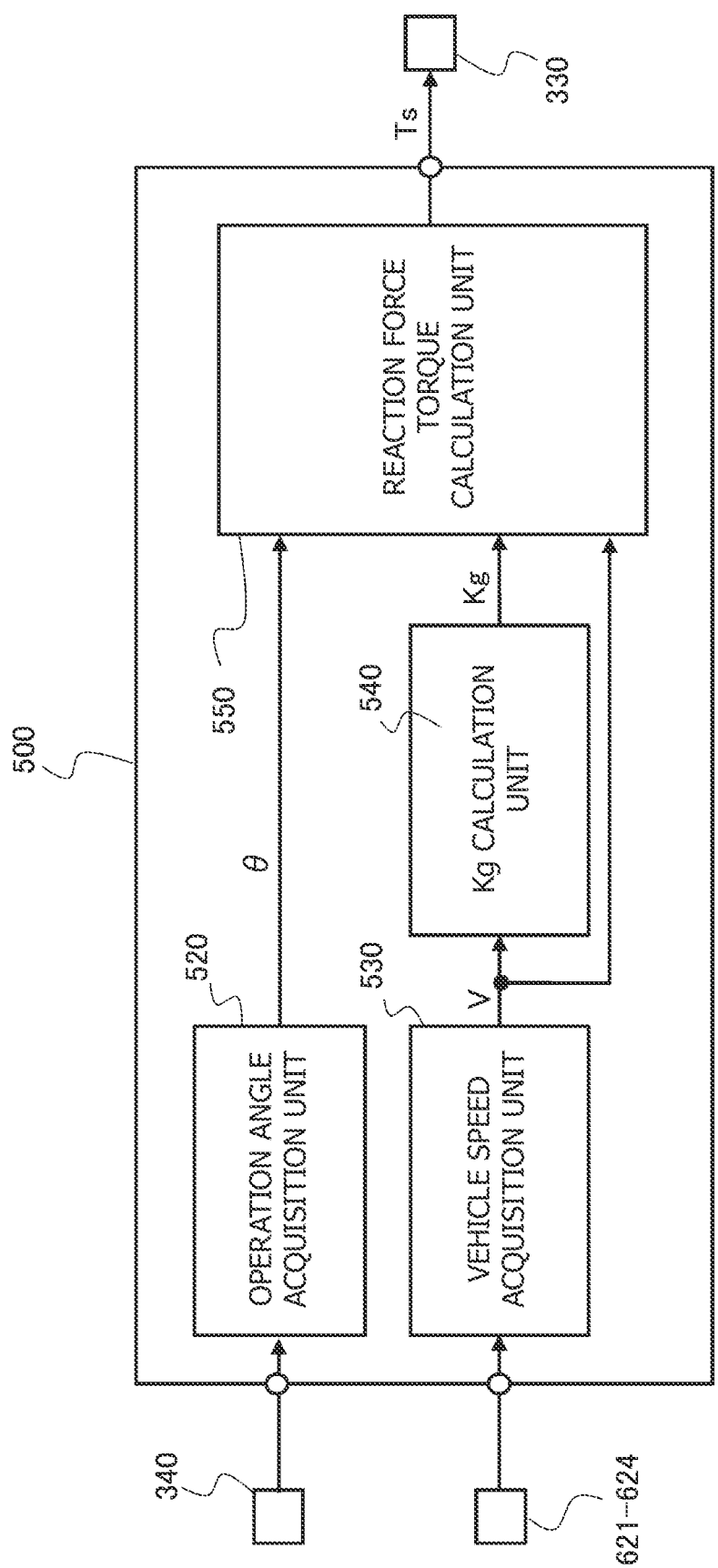
FIG. 2 is a functional block diagram of a steering control device.

FIG. 2 is a functional block diagram illustrating one aspect of steering control device 500 (more specifically, microcomputer 510).

Steering control device 500 has functions as an operation angle acquisition unit 520, a vehicle speed acquisition unit 530, a steering gear ratio calculation unit 540, and a reaction force torque calculation unit 550.

Operation angle acquisition unit 520 captures a signal output from operation angle sensor 340 to acquire information on the operation angle θ [deg] of steering wheel 310.

Note that the operation angle θ is signed data and indicates whether steering wheel 310 is operated in the right direction or the left direction from the neutral position using a sign.

Vehicle speed acquisition unit 530 captures signals output from wheel speed sensors 621 to 624 to acquire information on the vehicle speed V [km/h] of vehicle 100.

Note that vehicle speed acquisition unit 530 may capture an output from a vehicle speed sensor that detects the vehicle speed V from a rotation speed of a driving shaft of vehicle 100 to acquire information on the vehicle speed V.

Steering gear ratio calculation unit 540 captures information on the vehicle speed V from vehicle speed acquisition unit 530 and changes the set value of the steering gear ratio Kg in accordance with the information on the vehicle speed V.

That is, steering gear ratio calculation unit 540 functions as a steering gear ratio change unit.

Figure 3:
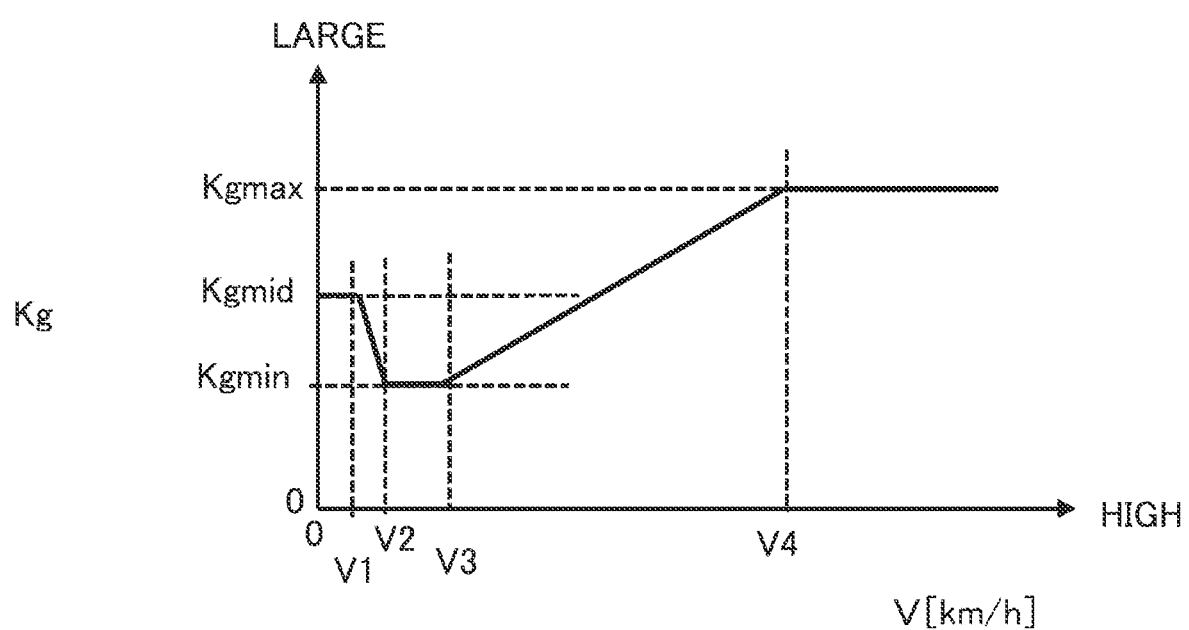
FIG. 3 is a diagram illustrating, as an example, the correlation between a vehicle speed V and a steering gear ratio Kg.

FIG. 3 is a diagram illustrating one aspect of the correlation between the vehicle speed V and the steering gear ratio Kg.

Steering gear ratio calculation unit 540 maintains the steering gear ratio Kg at a minimum value Kgmin in a speed range of the vehicle speed V from a vehicle speed V2 to a vehicle speed V3 (V2<V3).

Steering gear ratio calculation unit 540 proportionally increases the steering gear ratio Kg as the vehicle speed V increases in a speed range of the vehicle speed V from the vehicle speed V3 to a vehicle speed V4 (V3<V4) and maintains the steering gear ratio Kg at a maximum value Kgmax in a speed range of the vehicle speed V equal to or greater than the vehicle speed V4.

Steering gear ratio calculation unit 540 proportionally increases the steering gear ratio Kg as the vehicle speed V decreases in a speed range of the vehicle speed V from a vehicle speed V1 to the vehicle speed V2 (V1<V2) and maintains the steering gear ratio Kg at a median value Kgmid (Kgmin<Kgmid<Kgmax) in a speed range of the vehicle speed V equal to or less than the vehicle speed V1.

That is, in the example illustrated in FIG. 3, the steering gear ratio Kg is decreased as the vehicle speed V decreases in the speed range equal to or greater than the vehicle speed V2.

When vehicle 100 turns, while a low-speed turn often has a small turn radius and thus requires a large steering angle δ, a high-speed turn often has a large turn radius and thus usually does not require a large steering angle δ.

Thus, if the steering gear ratio Kg is constant regardless of the vehicle speed V, the driver may frequently change hand positions holding steering wheel 310 in a low-speed turn, which may increase the operational burden on the driver, and the direction of vehicle 100 may excessively change in response to an operation on steering wheel 310 in a high-speed turn, which may deteriorate the steering stability.

Thus, steering gear ratio calculation unit 540 basically decreases the steering gear ratio Kg as the vehicle speed V decreases, thereby ensuring a sufficient steering stability in a high speed range while reducing the operational burden on the driver in a low speed range. Note that the vehicle speeds V1 to V4 in FIG. 3 are, for example, the vehicle speed V1=5 km/h, the vehicle speed V2=10 km/h, the vehicle speed V3=20 km/h, and the vehicle speed V4=60 km/h.

However, the correlation between the vehicle speed V and the steering gear ratio Kg is not limited to the correlation illustrated in FIG. 3.

For example, steering gear ratio calculation unit 540 may maintain or increase the steering gear ratio Kg in response to an increasing change of the vehicle speed V without decreasing the steering gear ratio Kg in response to an increasing change of the vehicle speed V, so that the steering gear ratio Kg has a minimum value when the vehicle speed V is zero and is increased as the vehicle speed V increases.

Reaction force torque calculation unit 550 captures information on the vehicle speed V acquired by vehicle speed acquisition unit 530, the operation angle $\theta$ of steering wheel 310 acquired by operation angle acquisition unit 520, and the steering gear ratio Kg calculated by steering gear ratio calculation unit 540.

Then, reaction force torque calculation unit 550 obtains a command value of the steering reaction force torque Ts [Nm] (in other words, the output amount of reaction force actuator 330) based on the vehicle speed V, the operation angle $\theta$, an operation angular velocity $\Delta\theta$ [deg/s] calculated from the operation angle $\theta$, and the steering gear ratio Kg.

Note that reaction force torque calculation unit 550 calculates the steering reaction force torque Ts with a sign and indicates the direction of the steering reaction force torque Ts using the sign.

As will be described further later, reaction force torque calculation unit 550 has a function as a reaction force actuator control unit that controls the steering reaction force torque Ts in accordance with the operation angular velocity $\Delta\theta$ of steering wheel 310 and a function as a reaction force actuator output amount change unit that changes, based on the steering gear ratio Kg, the steering reaction force torque Ts corresponding to the operation angular velocity $\Delta\theta$.

First Embodiment

Figure 4:
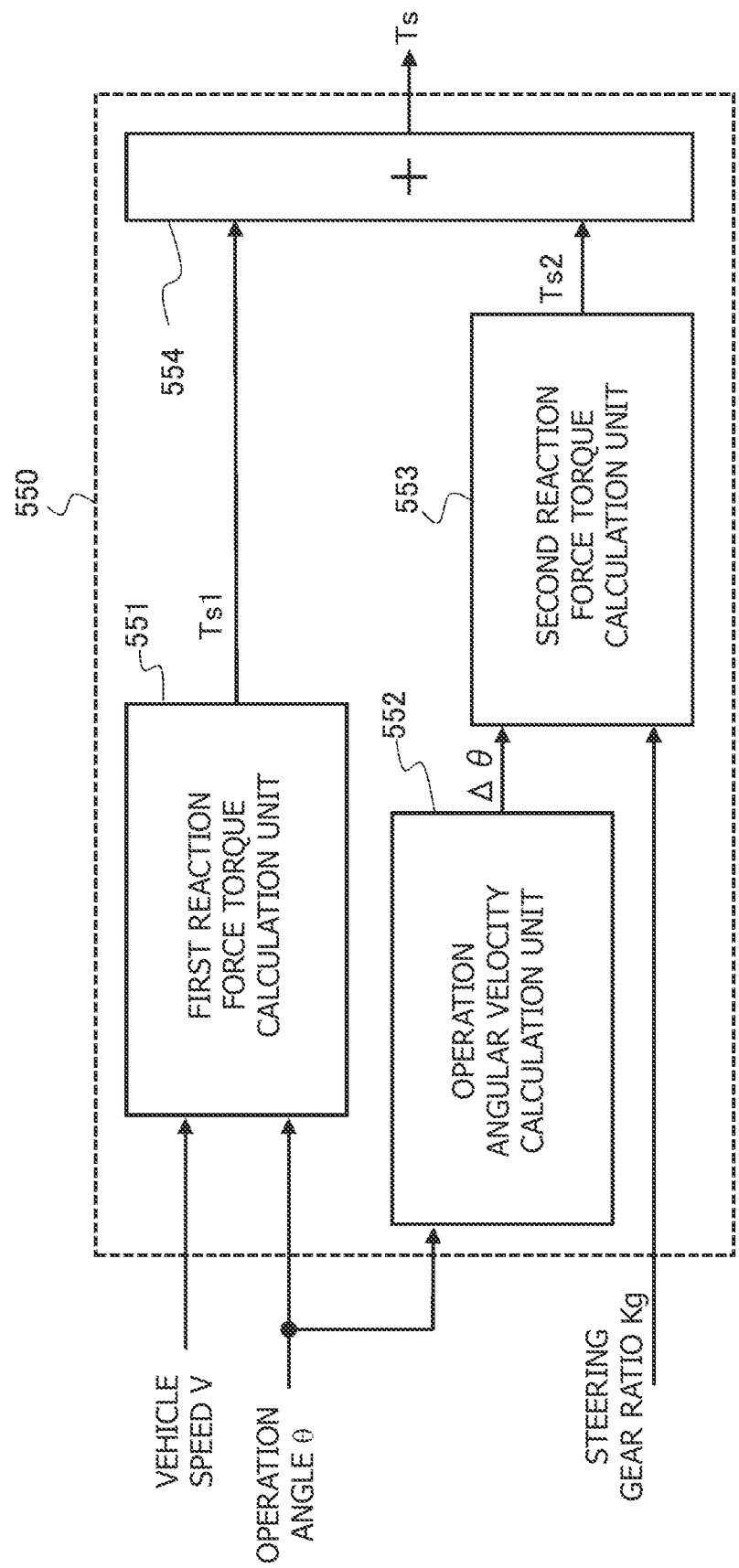
FIG. 4 is a functional block diagram illustrating a first embodiment of a reaction force torque calculation unit.

FIG. 4 is a functional block diagram illustrating a first embodiment of reaction force torque calculation unit 550.

Reaction force torque calculation unit 550 illustrated in FIG. 4 includes a first reaction force torque calculation unit 551, an operation angular velocity calculation unit 552, a second reaction force torque calculation unit 553, and an adder unit 554.

First reaction force torque calculation unit 551 calculates a first steering reaction force torque Ts1 based on an operation angle $\theta$ and a vehicle speed V.

Specifically, first reaction force torque calculation unit 551 calculates a steering reaction force torque Ts-$\theta$ based on the operation angle $\theta$ and calculates a first gain G1 based on the vehicle speed V. Then, first reaction force torque calculation unit 551 multiplies the steering reaction force torque Ts-$\theta$ by the first gain G1 to calculate the first steering reaction force torque Ts1 (Ts1=Ts-$\theta$·G1).

Figure 5:
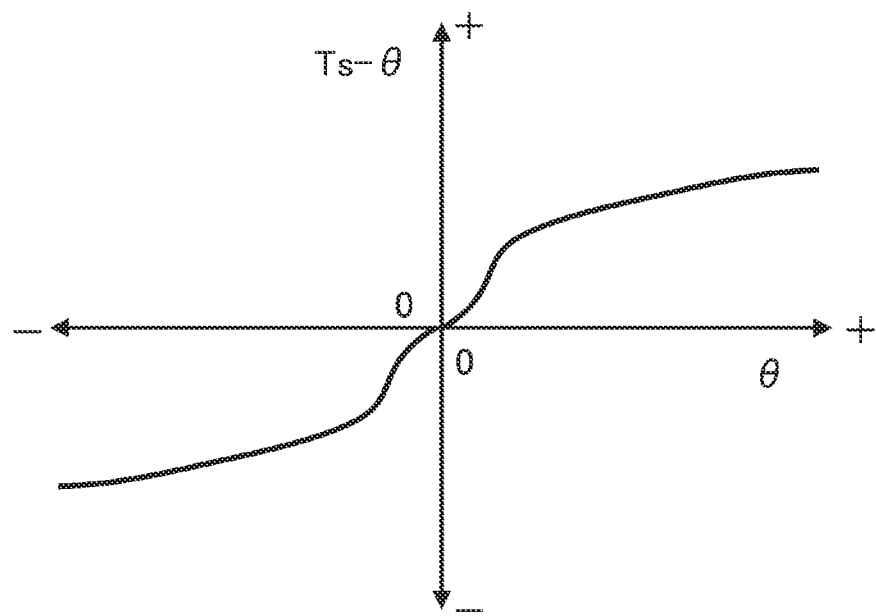
FIG. 5 is a diagram illustrating the correlation between an operation angle θ and a steering reaction force torque Ts–θ.

FIG. 5 is a diagram illustrating one aspect of the correlation between the operation angle $\theta$ and the steering reaction force torque Ts-$\theta$.

First reaction force torque calculation unit 551 sets the steering reaction force torque Ts-$\theta$ to zero when the operation angle $\theta$ is zero and steering wheel 310 is located at the neutral position.

First reaction force torque calculation unit 551 gradually increases the absolute value of the steering reaction force torque Ts-$\theta$ as the absolute value of the operation angle $\theta$ increases.

Figure 6:
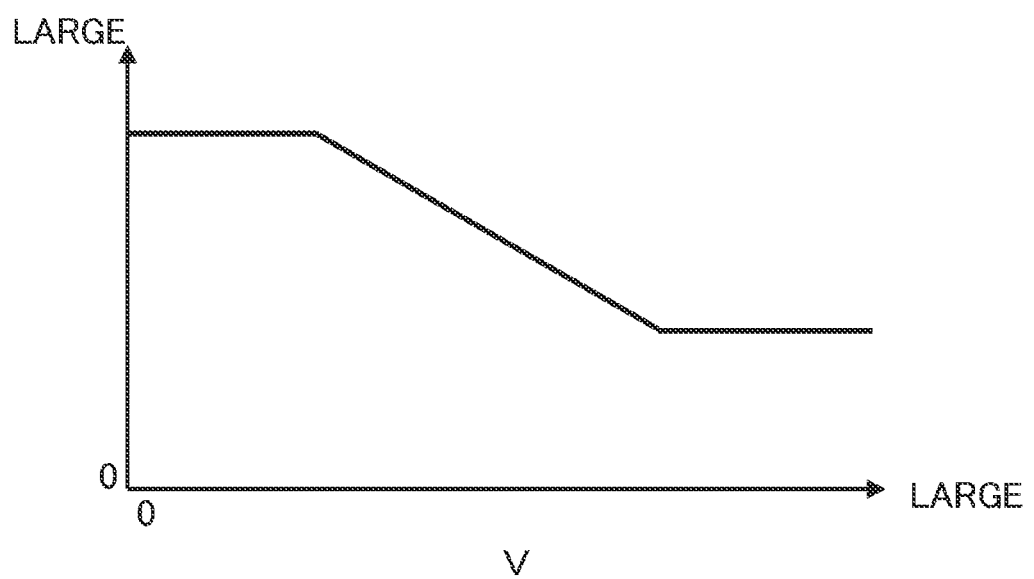
FIG. 6 is a diagram illustrating the correlation between the vehicle speed V and a first gain G1.

FIG. 6 is a diagram illustrating one aspect of the correlation between the vehicle speed V and the first gain G1.

First reaction force torque calculation unit 551 sets the first gain G1 (G1>0) to a larger value as the vehicle speed V decreases.

Accordingly, first reaction force torque calculation unit 551 sets the first steering reaction force torque Ts1 to a larger value as the absolute value of the operation angle $\theta$ of steering wheel 310 increases and also as the vehicle speed V at the time decreases.

Operation angular velocity calculation unit 552 differentiates data of the operation angle $\theta$ by time to calculate an operation angular velocity $\Delta\theta$ [deg/s].

Specifically, operation angular velocity calculation unit 552 obtains a difference between a latest value of the operation angle $\theta$ and a value of the operation angle $\theta$ acquired earlier by a predetermined time and obtains the operation angular velocity $\Delta\theta$, which is a change amount of the operation angle $\theta$ per unit time.

Second reaction force torque calculation unit 553 calculates a second steering reaction force torque Ts2 based on the operation angular velocity $\Delta\theta$ and a steering gear ratio Kg.

Specifically, second reaction force torque calculation unit 553 calculates a steering reaction force torque Ts-$\Delta\theta$ based on the operation angular velocity $\Delta\theta$ and also calculates a second gain G2 based on the steering gear ratio Kg. Then, second reaction force torque calculation unit 553 multiplies the steering reaction force torque Ts-$\Delta\theta$ by the second gain G2 to calculate the second steering reaction force torque Ts2 (Ts2=Ts-$\Delta\theta$·G2).

The function of second reaction force torque calculation unit 553 that calculates the steering reaction force torque Ts-$\Delta\theta$ based on the operation angular velocity $\Delta\theta$ corresponds to the function of the reaction force actuator control unit that controls the steering reaction force torque Ts in accordance with the operation angular velocity $\Delta\theta$ of steering wheel 310.

Also, the function of second reaction force torque calculation unit 553 that corrects the second steering reaction force torque Ts2 using the second gain G2 obtained based on the steering gear ratio Kg corresponds to the function of the reaction force actuator output amount change unit that changes, based on the steering gear ratio Kg, the steering reaction force torque Ts-$\Delta\theta$ corresponding to the operation angular velocity $\Delta\theta$.

Adder unit 554 captures the first steering reaction force torque Ts1 from first reaction force torque calculation unit 551, further captures the second steering reaction force torque Ts2 from second reaction force torque calculation unit 553, and obtains the sum of the first steering reaction force torque Ts1 and the second steering reaction force torque Ts2 as a command value of the final steering reaction force torque Ts (Ts=Ts1+Ts2).

That is, reaction force torque calculation unit 550 determines the steering reaction force torque Ts using the first steering reaction force torque Ts1 corresponding to the operation angle $\theta$ and the second steering reaction force torque Ts2 corresponding to the operation angular velocity $\Delta\theta$, corrects the first steering reaction force torque Ts1 corresponding to the operation angle $\theta$ in accordance with the vehicle speed V, and corrects the second steering reaction force torque Ts2 corresponding to the operation angular velocity $\Delta\theta$ in accordance with the steering gear ratio Kg.

Hereinbelow, a process of calculating the second steering reaction force torque Ts2 by second reaction force torque calculation unit 553 will be described in detail.

Figure 7:
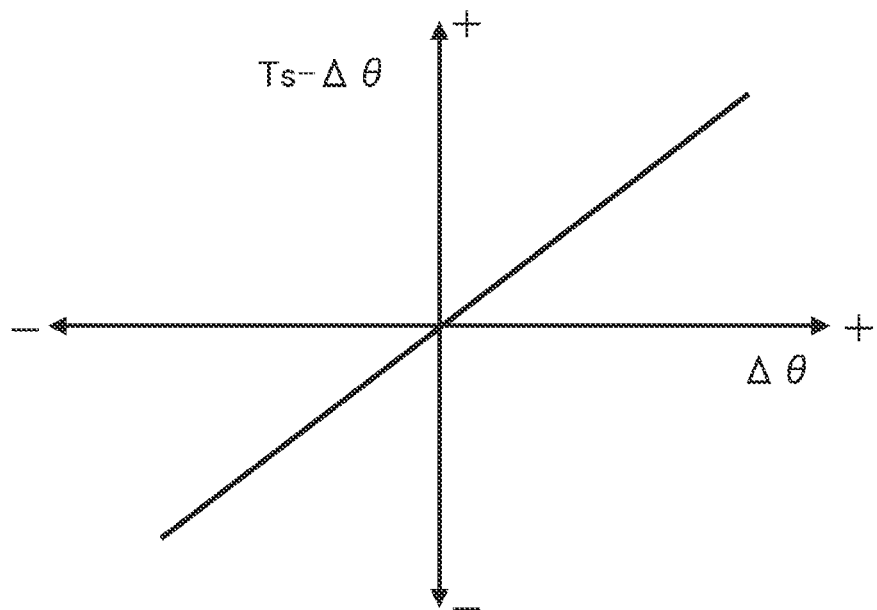
FIG. 7 is a diagram illustrating the correlation between an operation angular velocity Δθ and the steering reaction force torque Ts–0.

FIG. 7 is a diagram illustrating one aspect of the correlation between the operation angular velocity Δθ and the steering reaction force torque Ts–Δθ

Second reaction force torque calculation unit 553 sets the steering reaction force torque Ts–Δθ to zero when the operation angular velocity Δθ is zero and there is no change in the operation angle θ of steering wheel 310, in other words, the operation angle θ is maintained constant.

Second reaction force torque calculation unit 553 increases the absolute value of the steering reaction force torque Ts–Δθ as the absolute value of the operation angular velocity Δθ increases, and increases a steering reaction force torque applied to steering wheel 310 as the speed of turning steering wheel 310 increases.

Figure 8:
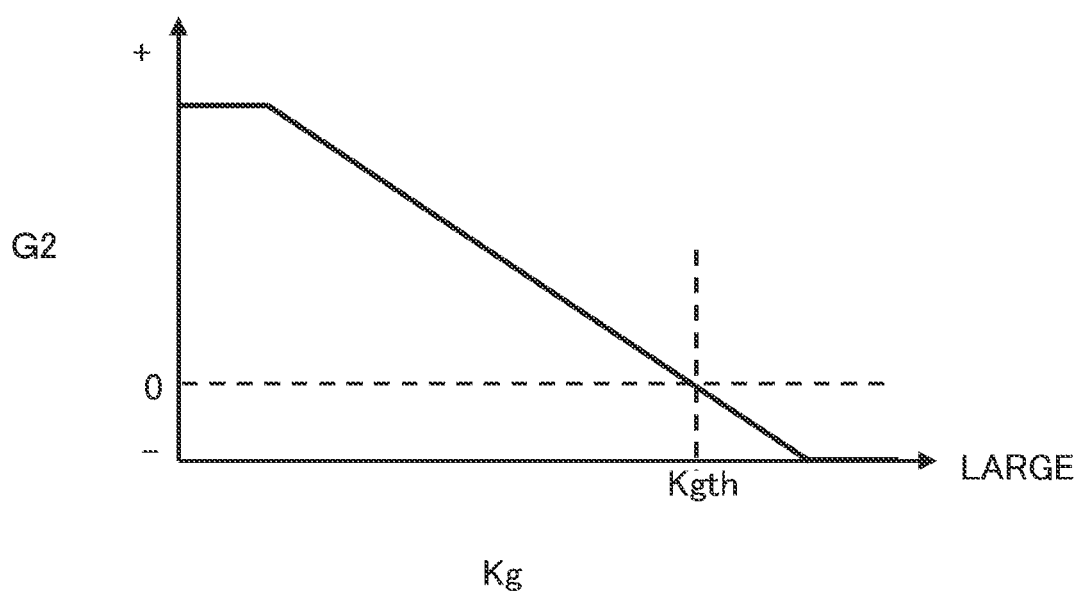
FIG. 8 is a diagram illustrating the correlation between the steering gear ratio Kg and a second gain G2.

FIG. 8 is a diagram illustrating one aspect of the correlation between the steering gear ratio Kg and the second gain G2.

Second reaction force torque calculation unit 553 sets the second gain G2 to a larger value as the steering gear ratio Kg decreases.

As the steering gear ratio Kg decreases, a steering angle δ relative to the operation angle θ increases, and a slight turn of steering wheel 310 greatly changes the turning angle of front wheels 101 and 102.

Thus, second reaction force torque calculation unit 553 sets the second gain G2 to a greater value as the steering angle δ relative to the operation angle θ increases.

Furthermore, second reaction force torque calculation unit 553 sets the second gain G2 to a positive value when the steering gear ratio Kg is less than a predetermined value Kgth, sets the second gain G2 to a negative value when the steering gear ratio Kg is greater than the predetermined value Kgth, and sets the second gain G2 to zero when the steering gear ratio Kg is the predetermined value Kgth.

Second reaction force torque calculation unit 553 increases the absolute value of the second gain G2 as the absolute value of the deviation between the steering gear ratio Kg and the predetermined value Kgth increases.

Figure 9:
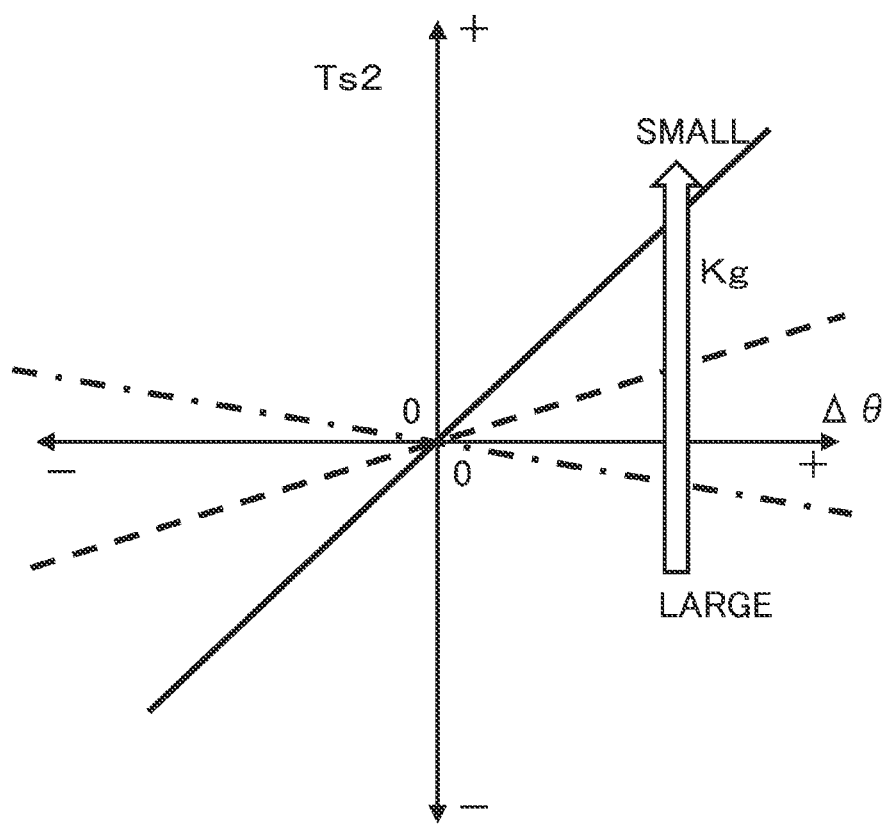
FIG. 9 is a diagram illustrating differences in a second steering reaction force torque Ts2 corresponding to the operation angular velocity Δθ caused by the steering gear ratio Kg.

FIG. 9 is a diagram illustrating the correlation between the second steering reaction force torque Ts2 obtained by multiplying the steering reaction force torque Ts–Δθ by the second gain G2 and the steering gear ratio Kg.

When the steering gear ratio Kg is less than the predetermined value Kgth, the second gain G2 is positive. Thus, the second steering reaction force torque Ts2 is calculated to have the same sign as the sign of the steering reaction force torque Ts–Δθ and the calculated value corrects the first steering reaction force torque Ts1 in an increasing manner.

The absolute value of the second steering reaction force torque Ts2 increases as the absolute value of the operation angular velocity Δθ increases and increases as the steering gear ratio Kg decreases.

That is, when the steering gear ratio Kg is less than the predetermined value Kgth, the steering reaction force torque applied to steering wheel 310 (in other words, the output amount of reaction force actuator 330) increases as the operation angular velocity Δθ increases and increases as the steering gear ratio Kg decreases.

Accordingly, when the driver suddenly operates steering wheel 310, which increases the operation angular velocity Δθ, in the low speed range in which the steering gear ratio Kg is set to a small value, second reaction force torque calculation unit 553 increases the second steering reaction force torque Ts2 to increase the steering reaction force torque Ts, thereby preventing an excessive turning of steering wheel 310.

On the other hand, even in the low speed range in which the steering gear ratio Kg is set to a small value, when the driver holds steering wheel 310 and the operation angular velocity Δθ becomes close to zero, second reaction force torque calculation unit 553 sets the steering reaction force torque Ts–Δθ to a value close to zero, thereby decreasing the second steering reaction force torque Ts2.

This reduces the operational burden on the driver holding steering wheel 310 and improves operating feel of the driver.

On the other hand, when the steering gear ratio Kg is greater than the predetermined value Kgth, the second gain G2 is set to a negative value. Thus, the sign of the second steering reaction force torque Ts2 is the inverse of the sign of the steering reaction force torque Ts–Δθ and the steering reaction force torque Ts–θ and the value of the second steering reaction force torque Ts2 corrects the first steering reaction force torque Ts1 in a decreasing manner.

Second reaction force torque calculation unit 553 increases the absolute value of the second steering reaction force torque Ts2 as the absolute value of the operation angular velocity Δθ increases and increases the absolute value of the second steering reaction force torque Ts2 as the steering gear ratio Kg increases.

Thus, when the steering gear ratio Kg is greater than the predetermined value Kgth, as the operation angular velocity Δθ increases, the absolute value of the second steering reaction force torque Ts2 with the inverted sign increases, and the steering reaction force torque Ts becomes less than that when the operation angular velocity Δθ is small.

That is, when the steering gear ratio Kg is greater than the predetermined value Kgth, second reaction force torque calculation unit 553 decreases the second steering reaction force torque Ts2 as the operation angular velocity Δθ increases.

Accordingly, even in the high speed range in which a large steering angle δ is usually not required, for example, when the driver suddenly operates steering wheel 310 to avoid an obstacle (in other words, when it is necessary to greatly turn steering wheel 310), the steering reaction force torque Ts becomes less than that in a case in which the operation angular velocity Δθ is small.

This reduces the operational burden on the driver and improves the steerability (obstacle avoiding performance) of vehicle 100.

Also, in the high speed range in which a large steering angle δ is usually not required, when the driver holds steering wheel 310 and the operation angular velocity Δθ is small, the steering reaction force torque Ts becomes greater than that in a case in which the operation angular velocity Δθ is large, which enables prevention of wobbling of steering wheel 310.

Note that the characteristic of the second gain G2 used to calculate the second steering reaction force torque Ts2 is not limited to the characteristic in FIG. 8, that is, the characteristic of gradually increasing from a negative value to a positive value as the steering gear ratio Kg decreases.

For example, second reaction force torque calculation unit 553 may set the second gain G2 to G2>0 and gradually increases the second gain G2 as the steering gear ratio Kg degreases.

Figure 10:
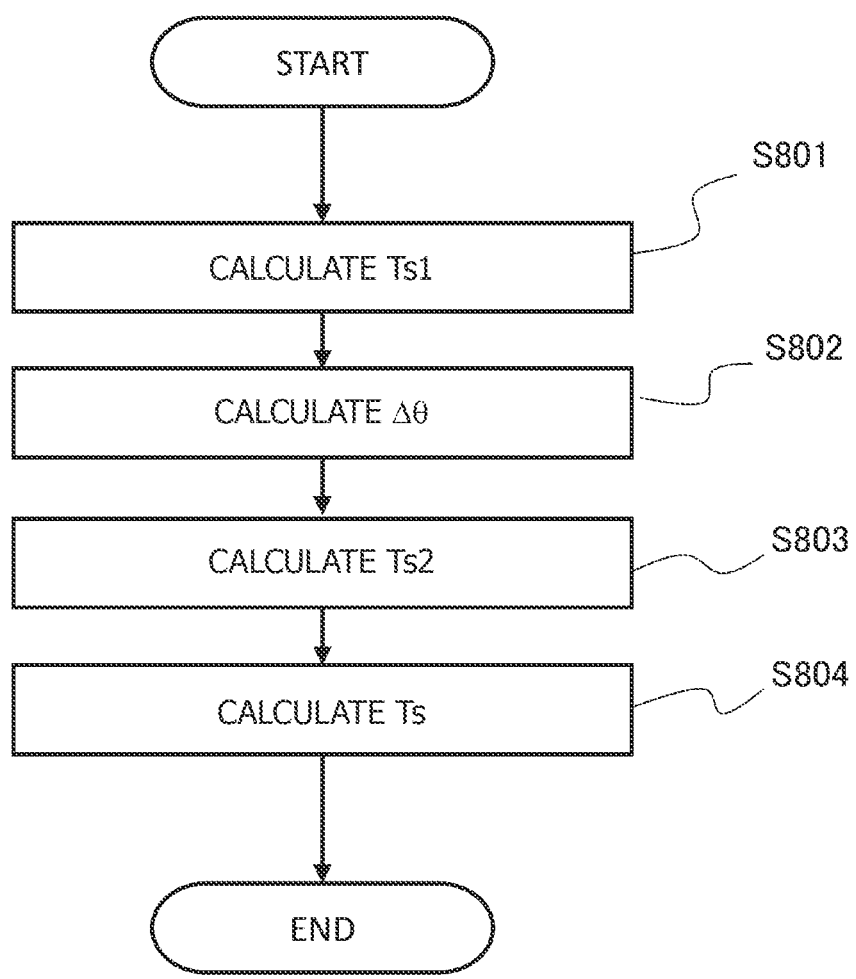
FIG. 10 is a flowchart illustrating a procedure of a process of calculating a steering reaction force torque Ts.

FIG. 10 is a flowchart illustrating a procedure of calculating the steering reaction force torque Ts by steering control device 500 (more specifically, reaction force torque calculation unit 550).

In step S801 (first reaction force torque calculation unit 551), steering control device 500 calculates the first steering reaction force torque Ts1 based on the vehicle speed V and the operation angle θ.

Then, in step S802 (operation angular velocity calculation unit 552), steering control device 500 calculates the operation angular velocity Δθ from the operation angle θ.

Furthermore, in the next step S803 (second reaction force torque calculation unit 553), steering control device 500 calculates the second steering reaction force torque Ts2 based on the operation angular velocity Δθ and the steering gear ratio Kg.

Then, in step S804 (adder unit 554), steering control device 500 adds the first steering reaction force torque Ts1 and the second steering reaction force torque Ts2 to obtain the steering reaction force torque Ts and outputs a command signal of the steering reaction force torque Ts to reaction force actuator 330.

Figure 11:
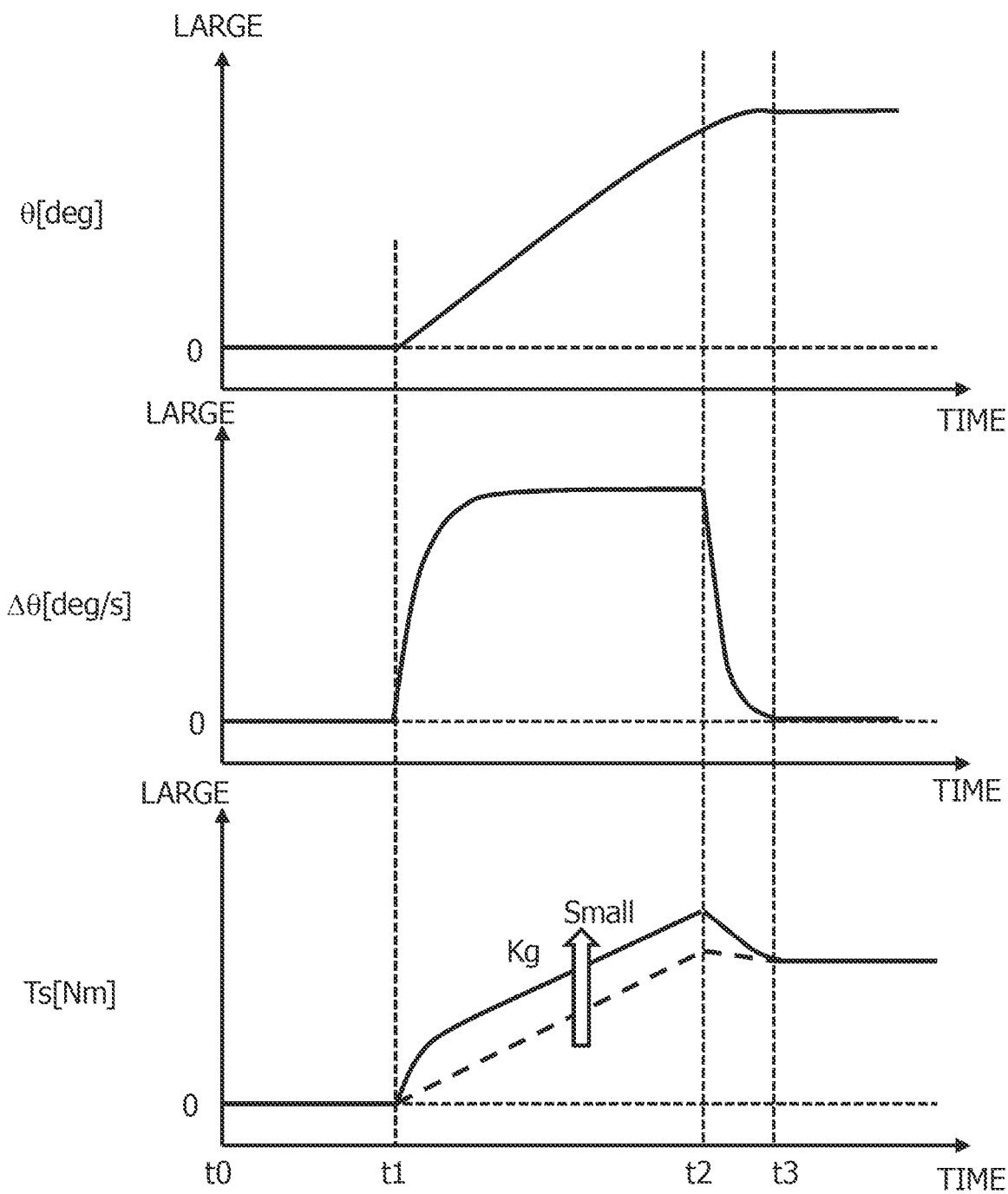
FIG. 11 is a time chart illustrating the correlation between the operation angle θ, the operation angular velocity Δθ, and the steering reaction force torque Ts.

FIG. 11 is a time chart illustrating, as an example, the correlation between the operation angle θ, the operation angular velocity Δθ, and the steering reaction force torque Ts in the low speed range in which the second gain G2 is set to a positive value.

In FIG. 11, a solid line indicates the steering reaction force torque Ts when the steering gear ratio Kg is a first steering gear ratio Kg1, and a broken line indicates the steering reaction force torque Ts when the steering gear ratio Kg is a second steering gear ratio Kg2 greater than the first steering gear ratio Kg1 (Kg1<Kg2).

As described above, the steering reaction force torque Ts is the sum of the first steering reaction force torque Ts1 corresponding to the operation angle θ and the second steering reaction force torque Ts2 corresponding to the operation angular velocity Δθ.

The first steering reaction force torque Ts1 increases as the absolute value of the operation angle θ increases.

On the other hand, the second steering reaction force torque Ts2 is set to zero when the operation angular velocity Δθ is zero (in other words, when the operation angle θ is constant) and increases as the absolute value of the operation angular velocity Δθ increases.

Thus, in a state in which steering wheel 310 is in a held state and the operation angular velocity Δθ is zero from time t0 to time t2 and the operation angular velocity Δθ is zero from time t3 to time t4, the steering reaction force torque Ts is equal to the first steering reaction force torque Ts1, and the steering reaction force torque Ts corresponding to the operation angle θ is set.

Also, in a state in which the operation angle θ changes from time t1 to time t3, the first steering reaction force torque Ts1 changes in an increasing manner as the operation angle θ increases. In addition, since the operation angular velocity Δθ is not zero, the second steering reaction force torque Ts2 is set to be greater as the operation angular velocity 40 increases, and the steering reaction force torque Ts greater than the first steering reaction force torque Ts1 is set.

In addition, since the second steering reaction force torque Ts2 increases as the steering gear ratio Kg decreases, in a state in which the operation angle θ changes from time t1 to time t3, the steering reaction force torque Ts when the steering gear ratio Kg is the first steering gear ratio Kg1 is greater than the steering reaction force torque Ts when the steering gear ratio Kg is the second steering gear ratio Kg2 (Kg1<Kg2).

Accordingly, the steering reaction force torque Ts is greater when the steering gear ratio Kg is small in a state in which the driver operates steering wheel 310 to turn than when the steering gear ratio Kg is large.

In this manner, in the low speed range, steering control device 500 decreases the steering gear ratio Kg to prevent the driver from frequently changing hand positions holding steering wheel 310 and also increases the steering reaction force torque Ts to prevent an operation on steering wheel 310, the operation excessively increasing the steering angle δ when the steering gear ratio Kg is decreased.

Thus, steering control device 500 can prevent vehicle behavior such as entanglement caused by a too small turning radius of vehicle 100, which enables the driver to more appropriately steer vehicle 100.

For example, when vehicle 100 enters an intersection, reaction force torque calculation unit 550 decreases the steering gear ratio Kg as the vehicle speed V decreases and, in parallel with this decreasing change of the steering gear ratio Kg, increases the second steering reaction force torque Ts2 corresponding to the operation angular velocity Δθ in response to the decrease in the steering gear ratio Kg.

Thus, even if the steering gear ratio Kg decreases when vehicle 100 enters an intersection, the turning radius of vehicle 100 is prevented from becoming too small, which improves the trace performance of vehicle 100 in turning at the intersection.

In addition, when the state of the driver goes from turning steering wheel 310 to holding steering wheel 310 in turning of vehicle 100, reaction force torque calculation unit 550 decreases the steering reaction force torque Ts in response to the occurrence of self-aligning torque.

Accordingly, the operational burden on the driver in a turning state can be reduced.

Second Embodiment

Figure 12:
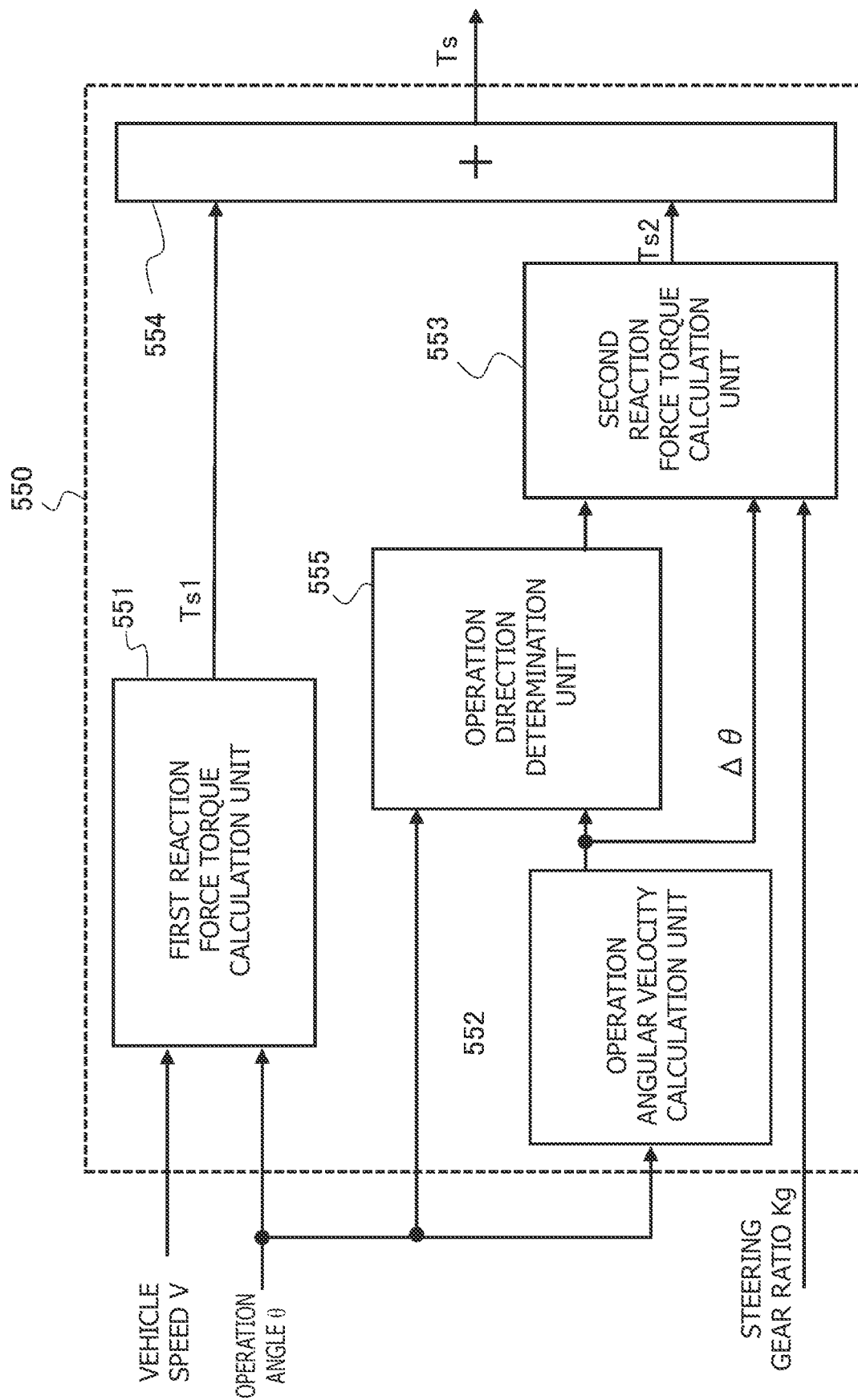
FIG. 12 is a functional block diagram illustrating a second embodiment of the reaction force torque calculation unit.

FIG. 12 is a functional block diagram illustrating a second embodiment of reaction force torque calculation unit 550.

In the second embodiment, reaction force torque calculation unit 550 includes first reaction force torque calculation unit 551, operation angular velocity calculation unit 552, second reaction force torque calculation unit 553, and adder unit 554 as with the first embodiment, and further includes an operation direction determination unit 555 additionally.

Operation direction determination unit 555 captures information on an operation angle θ and information on an operation angular velocity Δθ, determines whether steering wheel 310 is operated in the direction of additional steering or turning-back steering based on the operation angle θ and the operation angular velocity Δθ, and outputs a signal indicating the operation direction.

Operation direction determination unit 555 determines that the operation direction is the additional steering direction when the operation angle θ is positive and the operation angular velocity Δθ is positive and when the operation angle θ is negative and the operation angular velocity Δθ is negative.

Operation direction determination unit 555 determines that the operation direction is the turning-back steering direction when the operation angle θ is positive and the operation angular velocity Δθ is negative and when the operation angle θ is negative and the operation angular velocity Δθ is positive.

Second reaction force torque calculation unit 553 captures information on the operation direction from operation direction determination unit 555 in addition to information on the operation angular velocity Δθ and information on a steering gear ratio Kg and calculates a second steering reaction force torque Ts2 based on these pieces of information.

As with the first embodiment, second reaction force torque calculation unit 553 obtains a steering reaction force torque Ts−Δθ based on the operation angular velocity Δθ, obtains a second gain G2 based on the steering gear ratio Kg, and multiplies the steering reaction force torque Ts−Δθ by the second gain G2 to calculate a second steering reaction force torque Ts2.

Furthermore, second reaction force torque calculation unit 553 switches the second gain G2 in accordance with information on the operation direction, that is, in accordance with whether the operation direction of steering wheel 310 is the additional steering direction or the turning-back steering direction.

That is, second reaction force torque calculation unit 553 sets different gains G2 in accordance with the operation direction of steering wheel 310 even with the same the steering gear ratio Kg, and, as a result, changes the magnitude of the second steering reaction force torque Ts2 in accordance with the operation direction of steering wheel 310.

Figure 13:
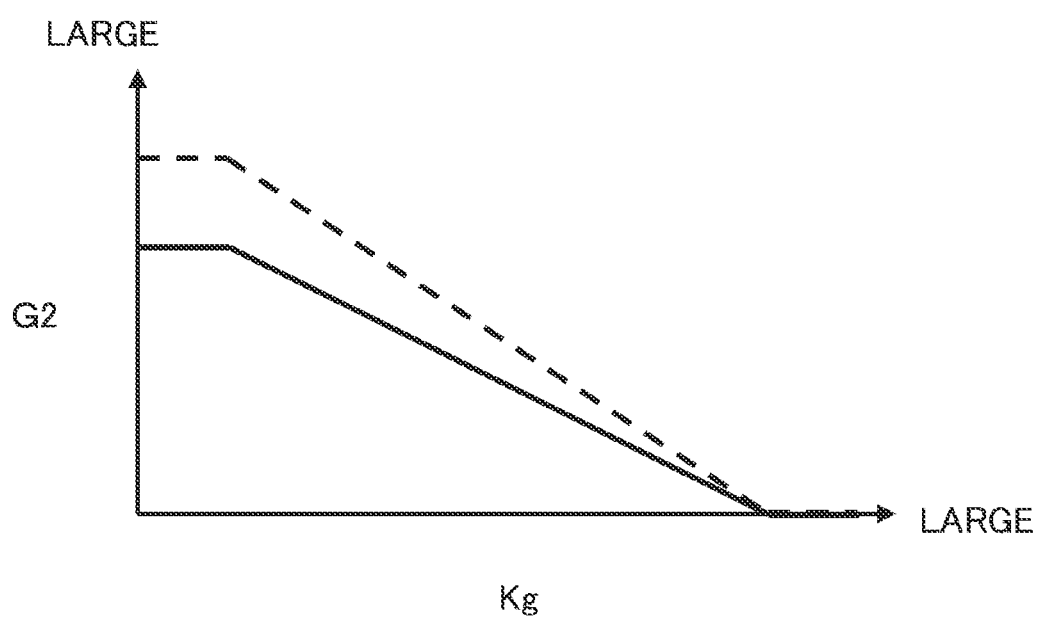
FIG. 13 is a diagram illustrating switching of the correlation between the steering gear ratio Kg and the second gain G2 in accordance with an operation direction (additional steering and turning-back steering).

FIG. 13 is a diagram illustrating the correlation between the steering gear ratio Kg and the second gain G2. A solid line in FIG. 13 indicates the second gain G2 used in additional steering, and a broken line in FIG. 13 indicates the second gain G2 used in turning-back steering.

Note that second reaction force torque calculation unit 553 may include a table used for additional steering and a table used for turning-back steering as tables (or functions) for obtaining the second gain G2 from the steering gear ratio Kg and switch the table to be referred to based on a result of the determination of operation direction determination unit 555.

Second reaction force torque calculation unit 553 increases the second gain G2 as the steering gear ratio Kg decreases and makes the second gain G2 larger in turning-back steering than in additional steering.

Specifically, the gradient of an increasing change in the second gain G2 relative to a decreasing change in the steering gear ratio Kg is made greater in turning-back steering than in additional steering, and the difference between the second gain G2 in turning-back steering and the second gain G2 in additional steering is increased as the steering gear ratio Kg decreases.

Accordingly, when the operation angular velocity Δθ increases in turning-back steering, second reaction force torque calculation unit 553 makes the second steering reaction force torque Ts2 and, in turn, the steering reaction force torque Ts, greater than those in additional steering to prevent a rough operation on steering wheel 310 in turning-back steering.

That is, an operation of the driver on steering wheel 310 tends to be rougher in turning-back steering of steering wheel 310 than in additional steering, which may deteriorate the turn trace performance of vehicle 100.

Thus, second reaction force torque calculation unit 553 makes the second steering reaction force torque Ts2 corresponding to the operation angular velocity Δθ greater in a turning-back steering operation than in an additional steering operation, thereby giving the driver a sense of response to the turning-back steering operation on steering wheel 310.

This prevents a rough operation on steering wheel 310 in turning-back steering and improves the turn trace performance of vehicle 100.

Note that the characteristic of switching the second gain G2 in accordance with the operation direction is not limited to the characteristic in FIG. 13.

For example, second reaction force torque calculation unit 553 may set the difference between the second gain G2 in the turning-back steering operation and the second gain G2 in the additional steering operation to a constant value or set the second gain G2 in the turning-back steering operation and the second gain G2 in the additional steering operation to the same value in an extremely low speed range.

Third Embodiment

Figure 14:
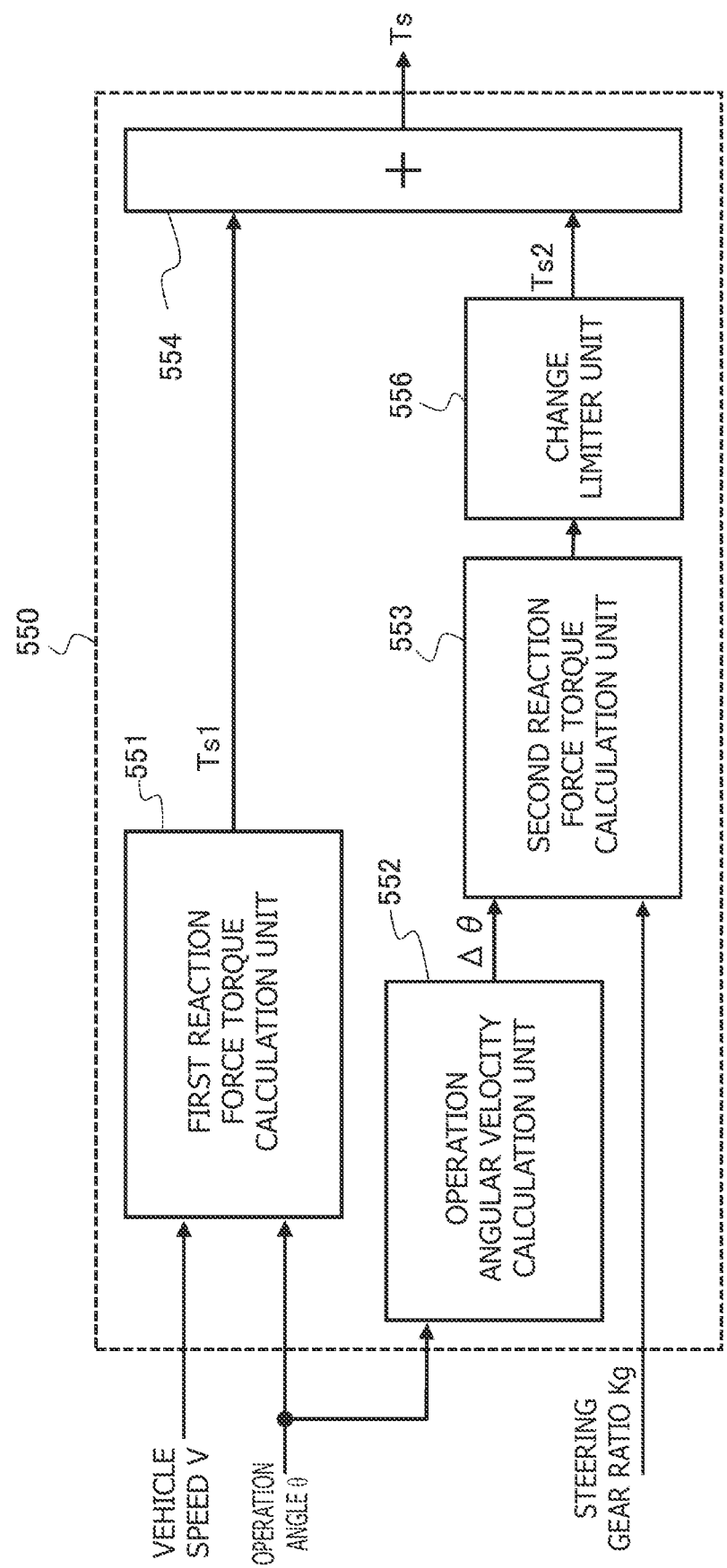
FIG. 14 is a functional block diagram illustrating a third embodiment of the reaction force torque calculation unit.

FIG. 14 is a functional block diagram illustrating a third embodiment of reaction force torque calculation unit 550.

In the third embodiment, reaction force torque calculation unit 550 includes first reaction force torque calculation unit 551, operation angular velocity calculation unit 552, second reaction force torque calculation unit 553, and adder unit 554 as with the first embodiment, and further includes a change limiter unit 556 additionally.

Change limiter unit 556 acquires a second steering reaction force torque Ts2 calculated by second reaction force torque calculation unit 553 based on an operation angular velocity Δθ and a steering gear ratio Kg, performs processing to limit a change in the acquired second steering reaction force torque Ts2, and outputs the processed second steering reaction force torque Ts2 to adder unit 554.

Specifically, when the difference between the second steering reaction force torque Ts2 output to adder unit 554 at the previous time in an arithmetic operation cycle and the second steering reaction force torque Ts2 acquired this time from second reaction force torque calculation unit 553 exceeds an upper limit value, change limiter unit 556 outputs, to adder unit 554, the second steering reaction force torque Ts2, of which the difference from the previous value of the second steering reaction force torque Ts2 is equal to the upper limit value.

By performing such an arithmetic process, change limiter unit 556 limits a change amount per unit time in the second steering reaction force torque Ts2 captured by adder unit 554 to the upper limit value or less.

If control of reaction force actuator 330 on the steering reaction force torque has a response delay, an overshoot or an undershoot of an actual steering reaction force torque give the driver an uncomfortable feeling of steering wheel 310 being returned.

When change limiter unit 556 changes the second steering reaction force torque Ts2 within a followable range of reaction force actuator 330, it is possible to prevent an overshoot and an undershoot of the actual steering reaction force torque and prevent an uncomfortable feeling of the driver caused by the change in the steering reaction force torque.

That is, a specification of change limiter unit 556 (specifically, the upper limit value used in the process of limiting the change in the second steering reaction force torque Ts2) is determined in accordance with the response delay of reaction force actuator 330 and applied so as to prevent an overshoot and an undershoot of the actual steering reaction force torque.

The technical ideas described in the embodiments may be combined as appropriate as long as they do not conflict.

Also, although the details of the present invention have been specifically described with reference to the preferred embodiments, it is obvious that those skilled in the art can conceive various modifications based on the basic technical ideas and teachings of the present invention.

For example, reaction force torque calculation unit 550 may include both operation direction determination unit 555 illustrated in FIG. 12 and change limiter unit 556 illustrated in FIG. 14.

Also, a change limiter unit that limits a change in the steering reaction force torque Ts obtained by adder unit 554 adding the first steering reaction force torque Ts1 and the second steering reaction force torque Ts2 and outputs the steering reaction force torque Ts to reaction force actuator 330 may be provided.

Also, the process of calculating the second steering reaction force torque Ts2 based on the operation angular velocity $\Delta\theta$ and the steering gear ratio Kg in second reaction force torque calculation unit 553 is not limited to the process of multiplying the steering reaction force torque Ts–$\Delta\theta$ calculated based on the operation angular velocity $\Delta\theta$ by the second gain G2 corresponding to the steering gear ratio Kg, and a calculation process that can obtain the second steering reaction force torque Ts2 with a characteristic equivalent to that in the embodiments may be employed as appropriate.

For example, second reaction force torque calculation unit 553 may have a plurality of conversion tables (or functions) for obtaining the second steering reaction force torque Ts2 from the operation angular velocity $\Delta\theta$ for different steering gear ratios Kg in one-to-one correspondence and obtain the second steering reaction force torque Ts2 corresponding to the operation angular velocity $\Delta\theta$ using the conversion table selected based on the steering gear ratio Kg at the time.

Steering device 200 may include a first electronic control device that controls steering input device 300 and a second electronic control device that controls steering actuator device 400 separately.

For example, the second electronic control device that controls steering actuator device 400 may have the function of the steering gear ratio change unit, and the first electronic control device that controls steering input device 300 may have the functions of the reaction force actuator control unit and the reaction force actuator output amount change unit.

REFERENCE SYMBOL LIST

100 Vehicle
101-104 Wheel
200 Steer-by-wire type steering device
300 Steering input device
310 Steering wheel (steering operation input member)
330 Reaction force actuator
340 Operation angle sensor
400 Steering actuator device
500 Steering control device (control device)
540 Steering gear ratio calculation unit (steering gear ratio change unit)
550 Reaction force torque calculation unit
551 First reaction force torque calculation unit
552 Operation angular velocity calculation unit
553 Second reaction force torque calculation unit (reaction force actuator control unit, reaction force actuator output amount change unit)
554 Adder unit
621-624 Wheel speed sensor

The invention claimed is:

1. A steer-by-wire type steering device mounted in a vehicle, the steer-by-wire type steering device comprising:
a steering input device including:
a steering operation input member; and
a reaction force actuator that applies a steering reaction force to the steering operation input member; and
a control device including:
a steering gear ratio change unit that changes a steering gear ratio in accordance with a vehicle speed of the vehicle, the steering gear ratio being a ratio of a steering angle of a wheel of the vehicle to an operation angle of the steering operation input member;
a reaction force actuator control unit that controls an output amount of the reaction force actuator in accordance with an operation angular velocity of the steering operation input member; and
a reaction force actuator output amount change unit that changes, based on the steering gear ratio, the output amount of the reaction force actuator corresponding to the operation angular velocity:
wherein the reaction force actuator output amount change unit:
increases the output amount of the reaction force actuator corresponding to the operation angular velocity as the operation angular velocity increases when the steering gear ratio is less than a predetermined value, and
decreases the output amount of the reaction force actuator corresponding to the operation angular velocity as the operation angular velocity increases when the steering gear ratio is greater than the predetermined value.

2. The steer-by-wire type steering device according to claim 1, wherein the control device further includes a change limiter unit that limits a change in the output amount of the reaction force actuator corresponding to the operation angular velocity.

3. The steer-by-wire type steering device according to claim 1, wherein;
the control device further includes an operation direction determination unit that determines whether an operation direction of the steering operation input member is additional steering or turning-back steering, and
the reaction force actuator output amount change unit increases the output amount of the reaction force actuator corresponding to the operation angular velocity as the steering gear ratio decreases and makes the output amount of the reaction force actuator corresponding to the operation angular velocity greater in the turning-back steering of the steering operation input member than in the additional steering.

4. The steer-by-wire type steering device according to claim 1, wherein the reaction force actuator control unit controls the output amount of the reaction force actuator based on a sum of a command value of the output amount of the reaction force actuator corresponding to the vehicle speed of the vehicle and the operation angle of the steering operation input member and a command value of the output amount of the reaction force actuator corresponding to the operation angular velocity.

5. A steer-by-wire type steering device mounted in a vehicle, the steer-by-wire type steering device comprising:
a steering input device including:
a steering operation input member; and
a reaction force actuator that applies a steering reaction force to the steering operation input member; and
a control device including:
a steering gear ratio change unit that changes a steering gear ratio in accordance with a vehicle speed of the vehicle, the steering gear ratio being a ratio of a steering angle of a wheel of the vehicle to an operation angle of the steering operation input member;

a reaction force actuator control unit that controls an output amount of the reaction force actuator in accordance with an operation angular velocity of the steering operation input member; and a reaction force actuator output amount change unit that changes, based on the steering gear ratio, the output amount of the reaction force actuator corresponding to the operation angular velocity, wherein the reaction force actuator output amount change unit changes the output amount of the reaction force actuator corresponding to the operation angular velocity using a gain, the gain being set to be greater as the steering gear ratio decreases.

6. The steer-by-wire type steering device according to claim 5, wherein:

the reaction force actuator control unit sets the output amount of the reaction force actuator corresponding to the operation angular velocity to zero when the operation angular velocity is zero and increases the output amount of the reaction force actuator corresponding to the operation angular velocity as the operation angular velocity increases.

7. The steer-by-wire type steering device according to claim 5, wherein:

the steering gear ratio change unit decreases the steering gear ratio as the vehicle speed of the vehicle decreases, the reaction force actuator control unit decreases the output amount of the reaction force actuator corresponding to the operation angular velocity as the operation angular velocity decreases and increases the output amount of the reaction force actuator corresponding to the operation angular velocity as the operation angular velocity increases.

* * * * *